Jan. 7, 1930. A. L. V. C. DEBRIE 1,743,027
CINEMATOGRAPHIC VIEW TAKING APPARATUS
Filed June 13, 1927   5 Sheets-Sheet 1
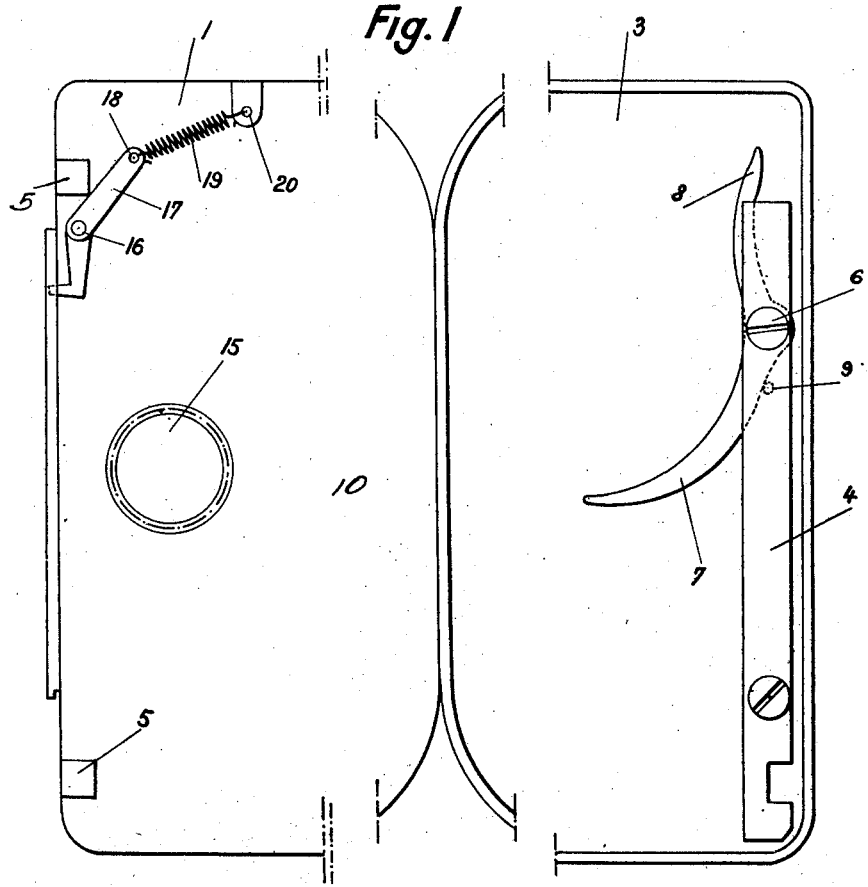
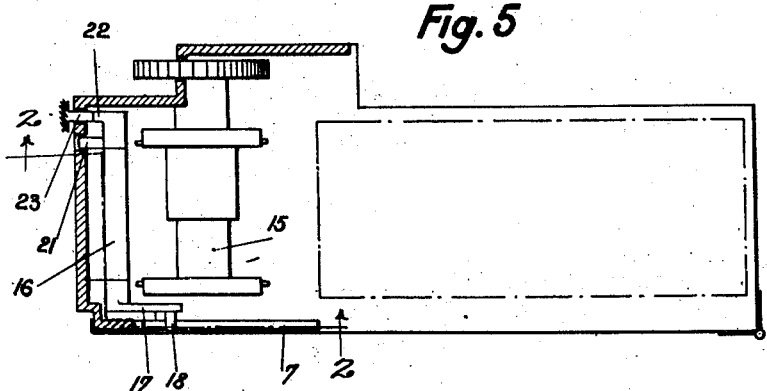
INVENTOR
André L. V. C. Debrie
by
Langner, Parry, Card and Langner
Att'ys.

Jan. 7, 1930.  A. L. V. C. DEBRIE  1,743,027
CINEMATOGRAPHIC VIEW TAKING APPARATUS
Filed June 13, 1927   5 Sheets-Sheet 2
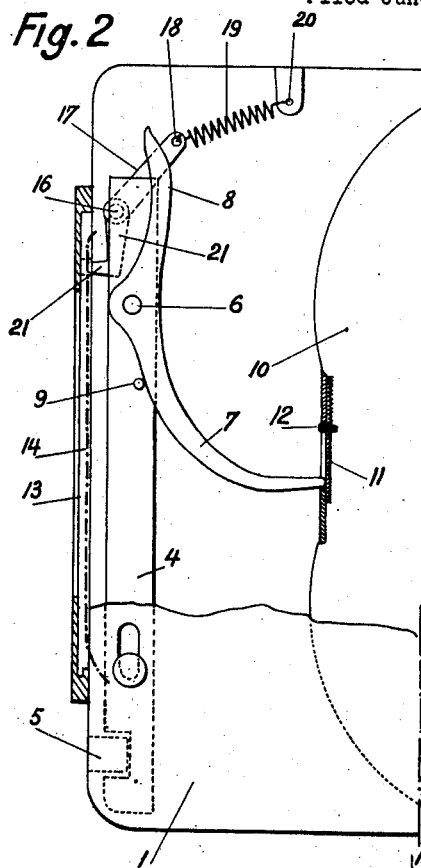
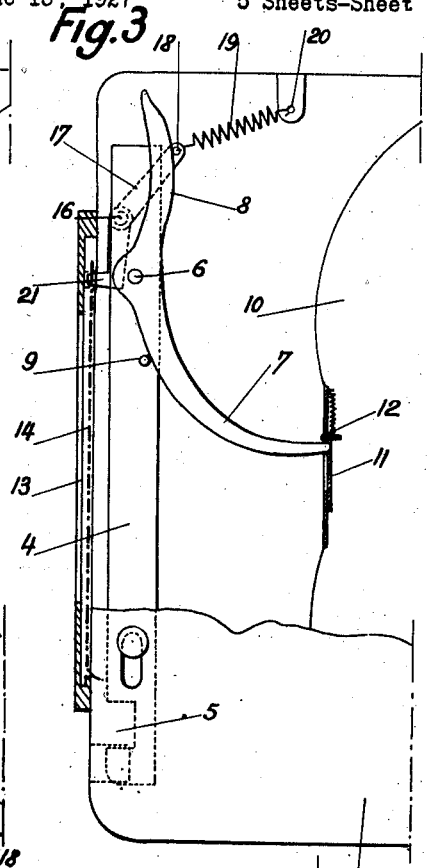
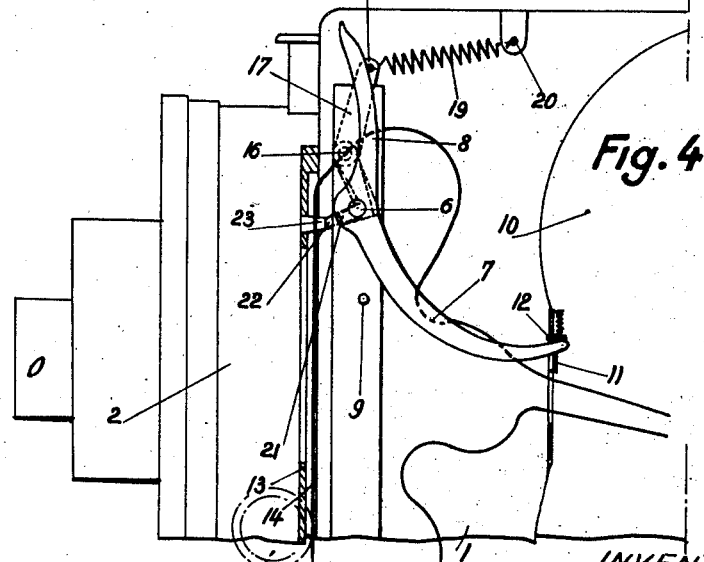
INVENTOR
André L. V. C. Debrie
by Langner, Parry, Card and Langner
Att'ys.

Jan. 7, 1930.  A. L. V. C. DEBRIE  1,743,027
CINEMATOGRAPHIC VIEW TAKING APPARATUS
Filed June 13, 1927   5 Sheets-Sheet 3

INVENTOR
André L. V. C. Debrie
by
Langner, Parry, Card and Langner
Attys.

Jan. 7, 1930.   A. L. V. C. DEBRIE   1,743,027
CINEMATOGRAPHIC VIEW TAKING APPARATUS
Filed June 13, 1927    5 Sheets-Sheet 4

INVENTOR
André L. V. C. Debrie
by
Attys.

Jan. 7, 1930.  A. L. V. C. DEBRIE  1,743,027
CINEMATOGRAPHIC VIEW TAKING APPARATUS
Filed June 13, 1927  5 Sheets-Sheet 5

Fig. 8

INVENTOR
André . L. V. C. Debrie

Patented Jan. 7, 1930

1,743,027

UNITED STATES PATENT OFFICE

ANDRÉ LÉON VICTOR CLÉMENT DEBRIE, OF PARIS, FRANCE

CINEMATOGRAPHIC VIEW-TAKING APPARATUS

Application filed June 13, 1927, Serial No. 198,668, and in France July 31, 1926.

My invention relates to view taking apparatuses comprising a front part containing the object glass or glasses and the film driving mechanism and a rear part adapted to be secured speedily and easily on the front part and containing the reel holding box and the guides for the film in front of the view taking aperture.

In view of ensuring a proper mounting of such apparatuses such as that disclosed in my copending U. S. application Ser. No. 95,416, filed on March 17, 1926, the rear part is provided with a catch or guiding stud which normally engages a perforation of the film so as to secure it in a given position and when the front part is secured over the rear part is forced backwards and releases the film.

Now my invention has for its object a catch device which causes the reel holding box to open automatically when the catch is forced backwards provided the cover of the rear part is closed.

I have shown by way of example on appended drawings two forms of execution of my invention.

Fig. 1 is a view of the rear part with the cover open.

Figs. 2, 3, and 4 are views of the same box, the cover not being shown and its locking device only being shown, certain parts being shown in vertical cross-section by a plane passing through line 2—2 of Fig. 5.

Fig. 5 is a plan view of the rear part of the apparatus with its cover closed the casing being shown in cross-section.

As may be readily seen the film guiding channel is shown in cross section on Figs. 2, 3 and 5.

Figure 7:
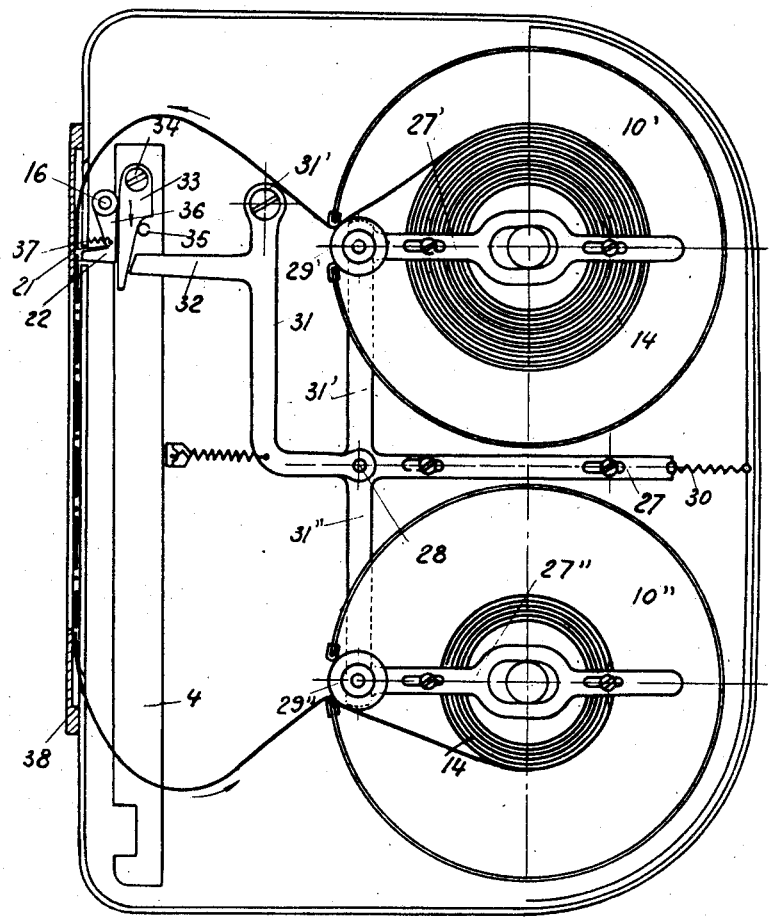

Figs. 7 and 8 illustrate diagrammatically two other modifications wherein the film reels are disposed in separate holders.

The rear part of the apparatus 1 to which is secured the front part 2 containing as stated the object glass O and the film driving mechanism M is closed by a cover 3 (Fig. 1) provided with a bolting rod 4 adapted to be engaged by the stops 5 (Figs. 2 and 3) borne by part 1. A lever pivotally secured at 6 to the rod 4 shows a lower hook shaped part 7 and a top part 8 slightly incurved in a direction opposed to that of part 7. A stop 9 borne by the rod 4, serves for preventing an exaggerated forward movement of part 7 of the lever.

On the rear part (Figs. 2, 3, 4) is mounted the reel holder 10 containing the take-up and the feed reels. The holder is closed by means of a sliding door 11 provided with a knob 12 adapted to come into the path of the lever arm 7 when the cover 3 is closed.

To the front of part 1 is disposed the guiding channel 13 wherein the film 14 is adapted to move when it is wound from the feed reel over the take up reel which is driven by the toothed drum 15 (Fig. 1).

A catch is pivotally secured to the axle 16 borne by the front of part 1 and is provided with an extension 17 bearing a pin 18 to which is secured a spring 19 the other end of which is secured at 20 to the apparatus. This catch is provided with two projections of unequal length 21 and 22 (Fig. 5), the longer of which 21 engages normally under the action of the spring 19 a perforation of the film 14, whereas the shorter projection 22 is pushed backwards, when the front part 2 is fitted on the rear part of the apparatus by a stud 23 borne by part 2, which stud makes the catch pivot and releases the film from the projection 21.

The working is the following: Before the front part is mounted on the rear part, the projection 21 engages the film. If the cover 3 is closed over part 1, the parts come into the position shown on Fig. 2 where the reel holder is closed. When the cover 3 is locked, the rod 4 slides together with lever 7, 8. The end of part 7 abuts against the knob 12 without raising it nor consequently opening the door 11. Part 8 comes into contact with the pin 18 on the catch (Fig. 3). Finally when the front part 2 is fitted on the rear part (Fig. 4) the stud 23 comes against the projection 22 whereby the catch is caused to pivot. Thereby the pin 18 bearing on the lever arm 8 makes it pivot so that the other arm 7 lifts the knob 12 and opens the door 11 of the reel holder.

As soon as the front part is removed, the catch 17 pivots forwards under the action of the spring 19. The lever 7—8 pivots also back in its original position and releases the knob 12 whereby the door 11 closes again.

Thus it is evident that the reel holder cannot be opened unless the cover 3 of the rear part is first bolted and the front part correctly secured to the rear part. When these two conditions are executed and in this case only the apparatus forms a completely closed box and the reel holder is opened without any danger of blurring the film it contains.

Figure 6:
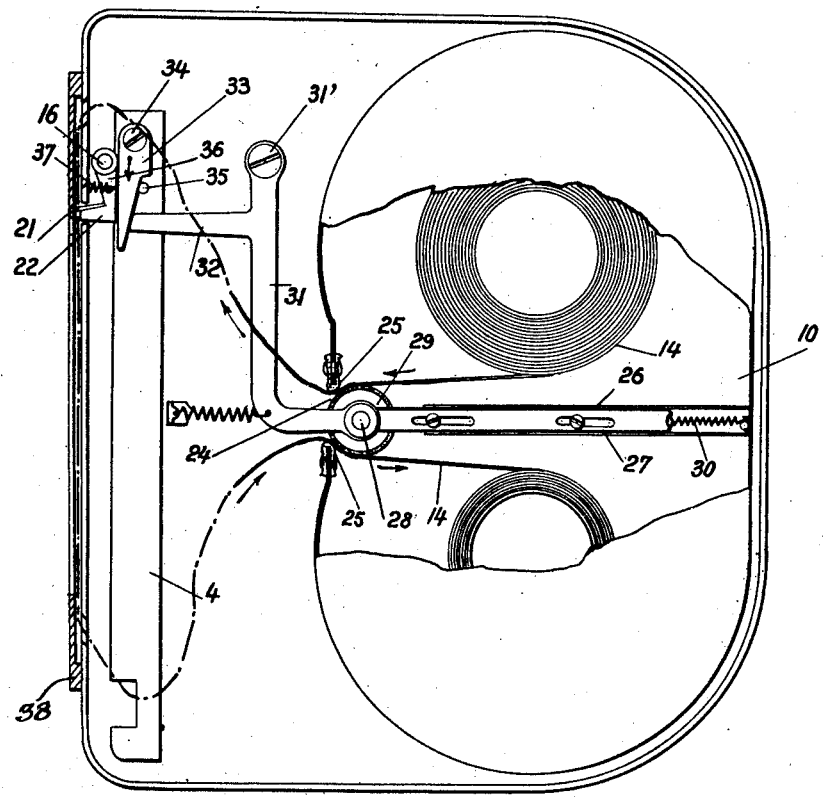
Fig. 6 shows a modified form of the invention.

Fig. 6 shows a modified form of the closure of the reel holder 10. The borders of the opening 24 for the film are lined with velvet 25 or similar material. The holder 10 is provided with a transverse slide 26 wherein a rod 27 is adapted to move. This rod bears at its end a spindle 28 on which is pivotally secured the roller 29 which may thus close the opening 24 of the holder.

The rod 27 is in contact with the incurved end of a lever 31 pivoting round the spindle 31' and provided with a lateral projection 32. The locking rod 4 of the cover of the rear part bears a wedge 33 pivotally secured to the spindle 34 and provided with a conical extension the movements of which are limited by the stop 35.

Part 1 shows as in the precedent case a spindle 16 for the pivoting catch which is provided with two projections of unequal length 21 and 22 and is subjected to the action of the spring 37. The film gate is shown diagrammatically at 38.

When the rod 4 is not in its locked position, the pointed end of the wedge 33 is disposed between the catch 36 and the arm 32 of the lever 31 without touching the latter. The rearward pivoting motion of the catch 36 could not be transmitted to the lever 31. On the contrary if the rod 4 is in its locked lower position as shown on Fig. 6 the extension of the stud is disposed between the catch 36 and the arm 32 along a section of the extension which allows it to be substantially in contact with both said parts. When the stud 23 of the front part 2 of the apparatus comes against the projection 22 the catch 36 pivots and acts through the wedge 33 on part 32 which is caused to move backwards. This makes the arm 31 pivot round the spindle 31' and the roller 29 is pushed backwards so as to allow the film 14 to pass out of the holder. It should be noted the two parts of the film moving out of and into the holder both bear on the roller 29 which they both set rotating in the same direction.

Fig. 7 is a modification of Fig. 6 showing two separate heel holders 10' and 10" for the take-up and for the feed films instead of a single holder as in the precedent case. The lever 31 is forked at 31', 31", so as to control simultaneously the slides 27' and 27", and consequently the closing rollers 29', 29" for the holders 10' and 10".

Similarly, Fig. 8 shows a modification of Fig. 2 wherein the lever 7 controls a slide 7' adapted to control simultaneously the doors 11' and 11" of the two holders.

What I claim is:

1. A cinematographic view taking apparatus comprising a front part, a removable rear part adapted to be secured on said front part and containing the reel holder, a cover for said rear part, a bolt adapted to lock said cover in closing position, a movable stud borne by the removable part and adapted to engage the film perforations, a lever arrangement adapted to be actuated by said stud when pushed backwards, means whereby the said lever arrangement opens the reel holder when actuated by said stud, means whereby the bolt for the cover sets said lever arrangement in operative engagement with the stud when the cover is closed and locked and means whereby the front part of the apparatus is caused when fitted on the rear part to press said stud out of the perforations of the film and to cause it to actuate the lever arrangement.

2. A cinematographic view taking apparatus comprising a front part, a removable rear part adapted to be secured on said front part, and containing the reel holders, a cover for said rear part, a bolt adapted to lock said cover in closing position, a movable stud borne by the removable part and adapted to engage the film perforations, a lever adapted to open the reel holders, means whereby the bolt for the cover sets said lever in operative engagement with the stud when the cover is closed and locked, a spindle bearing the stud perpendicularly to its axis, a projection shorter than the stud borne by said spindle, a projection borne by the front part of the apparatus and adapted to press the first mentioned projection when the front part is fitted on the rear part and thereby to release the stud from the film perforations against the action of the spring and to make it actuate the lever.

3. A cinematographic view taking apparatus comprising a front part, a removable rear part adapted to be secured on said front part and containing the reel holders, a cover for said rear part, a bolt adapted to lock said cover in closing position, a spindle borne by and adapted to rock round its axis in the removable part, a stud borne by the spindle perpendicularly to its axis and adapted to engage the film perforations, a slide inside each film holder, a rod sliding in said slide, a roller borne by the fore end of said sliding rod and adapted to normally close the film holder, a pivoting lever adapted to force the roller backwards, a wedge pivotally borne by the bolt and adapted to be operatively inserted between the spindle and the lever when the cover is closed and locked, a projection shorter than the stud borne by the spindle, a projection borne by the front part of the apparatus and adapted to press the first mentioned projection when the front part is fitted on the rear part and thereby to release the stud from the film perforations, and to make it actuate the lever through the wedge.

In testimony whereof I have signed my name to this specification.

ANDRÉ LÉON VICTOR CLÉMENT DEBRIE.